(12) United States Patent
Keitaanniemi

(10) Patent No.: US 12,681,037 B2
(45) Date of Patent: Jul. 14, 2026

(54) ACOUSTIC WIND MEASUREMENT

(71) Applicant: Vaisala Oyj, Helsinki (FI)

(72) Inventor: Joonas Keitaanniemi, Espoo (FI)

(73) Assignee: Vaisala Oyj, Helsinki (FI)

( * ) Notice: Subject to any disclaimer, the term of this patent is extended or adjusted under 35 U.S.C. 154(b) by 306 days.

(21) Appl. No.: 18/391,305

(22) Filed: Dec. 20, 2023

(65) Prior Publication Data

US 2024/0210438 A1      Jun. 27, 2024

(30) Foreign Application Priority Data

Dec. 22, 2022    (EP) .................................... 22215975

(51) Int. Cl.
G01P 5/24 (2006.01)

(52) U.S. Cl.
CPC .............. G01P 5/241 (2013.01); G01P 5/245 (2013.01)

(58) Field of Classification Search
CPC .......... G01P 5/241; G01P 5/245; G01P 5/244; G01P 13/045
See application file for complete search history.

(56) References Cited

U.S. PATENT DOCUMENTS

| | | | | | |
|---|---|---|---|---|---|
| 4,615,214 | A | * | 10/1986 | Burns | ........................ G01P 5/02 73/170.15 |
| 2002/0174729 | A1 | * | 11/2002 | Danninger | .............. G01F 1/363 73/861.63 |

FOREIGN PATENT DOCUMENTS

| | | | |
|---|---|---|---|
| CN | 109425752 A | 3/2019 | |
| CN | 112924715 A | 6/2021 | |
| CN | 113567706 A | 10/2021 | |
| GB | 2540737 A | * 2/2017 | .............. G01P 5/241 |
| WO | 2016142071 A1 | 9/2016 | |

OTHER PUBLICATIONS

European Search Report, as issued in connection with European Application No. EP 22 21 5975, dated May 25, 2023, 2 pgs.

* cited by examiner

*Primary Examiner* — Tarun Sinha
(74) *Attorney, Agent, or Firm* — MASCHOFF BRENNAN; Paul G. Johnson

(57) ABSTRACT

A wind measurement apparatus comprises: cover and base portions arranged to allow for airflow therebetween; N receivers on the cover portion; a transmitter on the cover portion at a substantially equal distance from each of the N receivers; and a reflector assembly on the base portion. The reflector assembly is divided into N concave reflector portions. Each receiver is associated with one of the reflector portions. The reflector assembly and the base portion are disposed such that the transmitter is spatially aligned with a center point of the reflector assembly and each receiver is spatially aligned with the associated reflector portion. The transmitter is arranged to transmit a TX beam towards the reflector assembly such that the TX beam meets each of the reflector portions. Each of the receivers is arranged to receive, via the associated reflector portion, a reflection of a TX beam portion that meets the reflector portion.

15 Claims, 4 Drawing Sheets

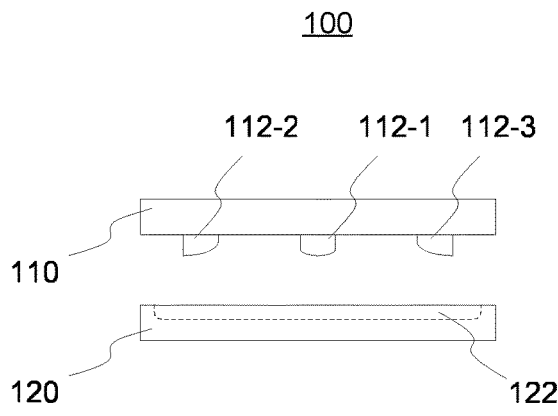
Figure 1A
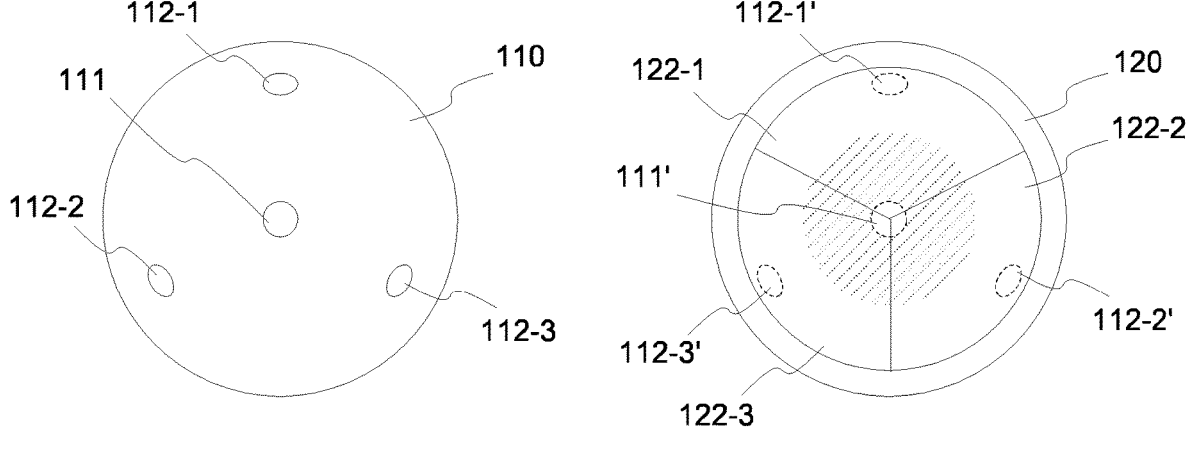
Figure 1B                    Figure 1C

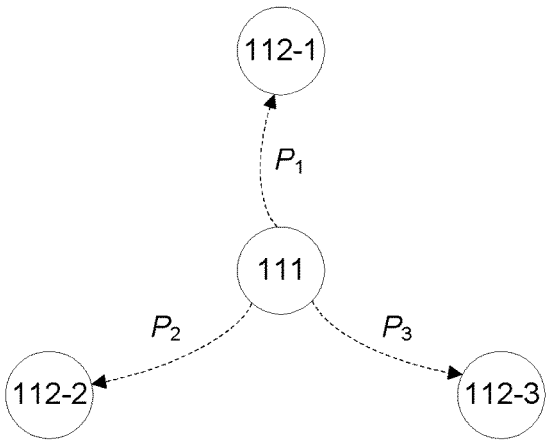
Figure 4
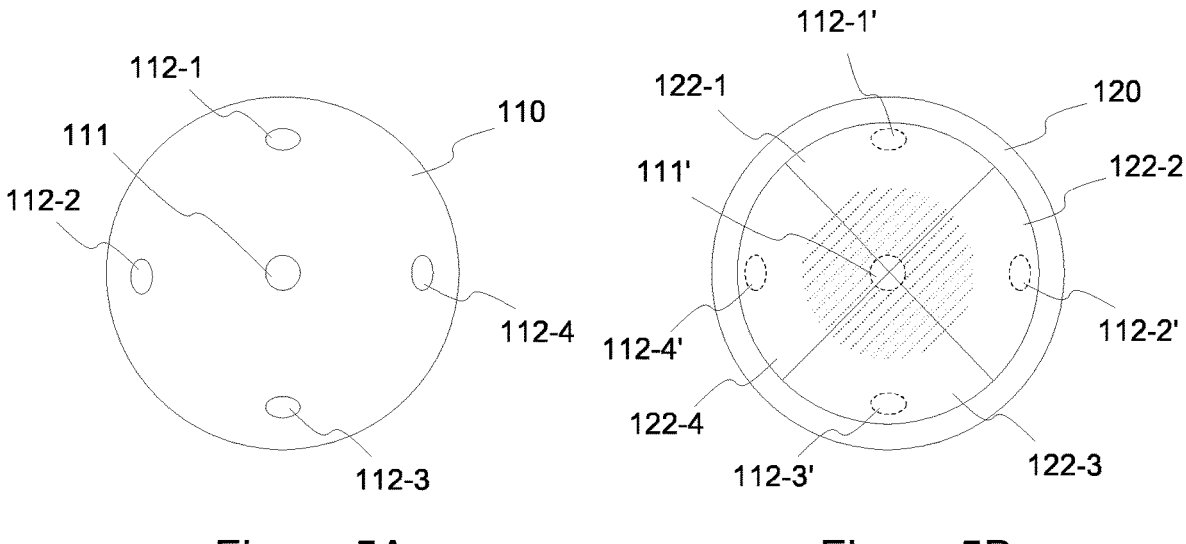
Figure 5A
Figure 5B

ACOUSTIC WIND MEASUREMENT

TECHNICAL FIELD

The example and non-limiting embodiments of the present invention relate to an anemometer apparatus for acoustic wind measurement.

BACKGROUND

Knowledge of wind conditions is important for a number of human activities, both in professional and in recreational fields. In this regard, accurate and reliable measurement of wind speed and wind direction is essentially important for example in aviation and marine operations as well as in industrial contexts such as energy production by wind turbines. One of the techniques currently applied for measurement of wind speed and wind direction in such professional contexts involves measurement of time of flight of a sound signal using a dedicated measurement apparatus that comprises one or more pairs of a transmitter and a receiver. In such a measurement apparatus each pair of a transmitter and receiver may serve to provide a respective measurement path, whereas three or more measurement paths are typically considered as a requirement for reliable measurement of the wind speed and wind direction. Typically, increasing number of measurement paths results in increased accuracy and reliability of the measurement, whereas increasing the number of measurement paths typically also increases the number of components required for the measurement apparatus, which in turn typically result in increasing structural complexity and increasing manufacturing cost of the measurement apparatus.

SUMMARY

It is an object of the present invention to provide a wind measurement apparatus that is relatively simple in structure but that yet enables accurate, reliable and robust measurement of wind speed and wind direction.

According to an example embodiment, a wind measurement apparatus is provided, the apparatus comprising: a cover portion and a base portion arranged at a distance from each other to allow for an airflow therebetween; an arrangement of N receivers disposed on a base-portion-facing side of the cover portion in respective positions that serve as respective vertices of a convex regular polygon of order N, where N is at least three; a transmitter disposed on the base-portion facing side of the cover portion in a position that is at a substantially equal distance from each of the N receivers; and a reflector assembly arranged on a cover-portion-facing side of the base portion, wherein the reflector assembly is divided into N concave reflector portions, wherein each receiver is associated with one of the reflector portions and wherein the reflector assembly and the base portion are disposed with respect to each other such that the transmitter is spatially aligned with a center point of the reflector assembly and that each receiver is spatially aligned with the associated reflector portion, wherein the transmitter is arranged to transmit a measurement signal in a transmitter beam, TX beam, towards the reflector assembly such that the TX beam meets each of the reflector portions, and wherein each of the receivers is arranged to receive, via the associated reflector portion, a reflection of a TX beam portion that meets the respective reflector portion.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described in the following description of some example embodiments of the present invention may be used in combinations other than the combinations explicitly described unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where FIG. 1A schematically illustrates some components of a wind measurement apparatus according to an example;

FIG. 1B schematically illustrates some components of a wind measurement apparatus according to an example;

FIG. 1C schematically illustrates some components of a wind measurement apparatus according to an example;

FIG. 4 schematically illustrates measurement paths between a transmitter and receivers of a wind measurement apparatus according to an example;

FIG. 5A schematically illustrates some components of a wind measurement apparatus according to an example;

FIG. 5B schematically illustrates some components of a wind measurement apparatus according to an example.

DESCRIPTION OF SOME EMBODIMENTS

Figure 2:
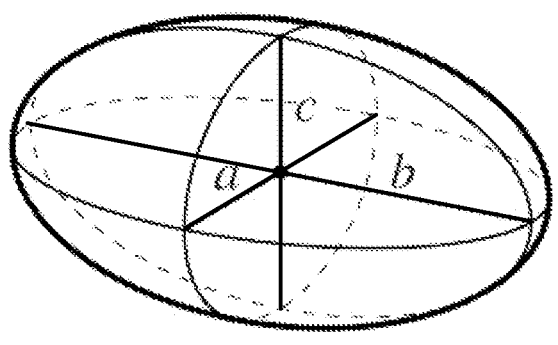
FIG. 2 illustrates some characteristics of an ellipsoidal shape according to an example.

FIGS. 1A, 1B and 1C schematically illustrate some components of a wind measurement apparatus 100 according to a first example. The wind measurement apparatus 100 comprises a cover portion 110 and a base portion 120 arranged at a distance from each other to form a gap that allows for an airflow through a measurement volume provided between the cover portion 110 and the base portion 120. In the first example, the cover portion 110 comprises an arrangement of a single transmitter 111 and three receivers 112-1, 112-2, 112-3 disposed on its base-portion-facing side (e.g. on its base-portion-facing surface), whereas the base portion 120 comprises a reflector assembly 122 arranged on a cover-portion-facing side (e.g. on the cover-portion-facing surface) of the base portion 120. In operation of the wind measurement apparatus 100, the transmitter 111 may transmit a measurement signal towards the reflector assembly 122 and each of the receivers 112-1, 112-2, 112-3 may receive respective reflections of the measurement signal originating from the transmitter 111 from the reflector assembly 122, thereby enabling measurement of characteristics (such as speed and direction) of the airflow passing through the gap between cover portion 110 and the base portion 120. The wind measurement apparatus 100 may be also referred to as an anemometer apparatus and it may be applicable for measuring one or more wind characteristics, such as wind speed and wind direction, via usage of acoustic measurement signals transmitted from the transmitter 111 and received at the receivers 112-1, 112-2, 112-3, thereby implementing acoustic wind measurement.

The schematic illustration of FIG. 1A provides a 'side view' to the wind measurement apparatus 100 according to the first example, showing the cover portion 110 and the base portion 120 together with the receivers 112-1, 112-2, 112-3 arranged on the base-portion-facing side of the cover portion 110. The illustration of FIG. 1A does not show the transmitter 111 since it is located behind the receiver 112-1 in the illustration. The base portion 120 may be attached to the cover portion 110 via a plurality of support elements (not shown in the illustration of FIG. 1A). The distance between the cover portion 110 and the base portion 120 is dependent on a spatial arrangement of the transmitter 111 and the receivers 112-1, 112-2, 112-3 in consideration of characteristics of the reflector assembly 122. This aspect of the wind measurement apparatus 100 is described in further detail in the examples provided in the following.

FIG. 1B schematically illustrates the base-portion-facing side of the cover portion 110 according to the first example, showing the transmitter 111 and the receivers 112-1, 112-2, 112-3 arranged in the cover portion 110 such that their respective front faces are substantially facing the reflector element 122 provided on the cover-portion-facing side of the base portion 120. The receivers 112-1, 112-2, 112-3 may be disposed at respective positions that correspond to respective vertices of a (conceptual) equilateral triangle arranged on the base-portion-facing side of the cover portion 110, thereby constituting a trilaterally symmetrical arrangement of the receivers 112-1, 112-2, 112-3 on the base-portion-facing side of the cover portion 110, where respective positions of the receivers 112-1, 112-2, 112-3 define a reference plane. The transmitter 110 may be arranged in a position that is at a substantially equal distance from each of the receivers 112-1, 112-2, 112-3. In this regard, the transmitter 111 may be disposed on an axis that meets the reference plane in a normal angle substantially at the center point of the (conceptual) equilateral triangle formed by the receivers 112-1, 112-2, 112-3.

As an example, the transmitter 111 may be disposed substantially on the reference plane, whereas in other examples the transmitter 111 may be (sightly) offset from the reference plane, either towards the base portion 120 or further away from the base portion 120.

As another way of specifying the arrangement of the transmitter 111 and the receivers 112-1, 112-2, 112-3, the receivers 112-1, 112-2, 112-3 may be disposed at respective positions that are evenly spread (i.e. evenly spaced) on a (conceptual) circle on the base-portion-facing side of the cover portion 110, whereas the transmitter 110 may be disposed on an axis that meets the reference plane defined by the respective positions of the receivers 112-1, 112-2, 112-3 in a normal angle substantially at the center point of said circle.

The distances between the receivers 112-1, 112-2, 112-3 may be chosen in view of the intended usage of the wind measurement apparatus 100 and/or on any requirements or constraints set for the size of the wind measurement apparatus 100. In non-limiting examples, the diameter of the (conceptual) circle at which the receivers 112-1, 112-2, 112-3 are located may have a diameter from a few centimeters to a few tens of centimeters.

The transmitter 111 may be arranged to transmit a transmitter (TX) beam that conveys a measurement signal towards the reflector assembly 122 for reflection therefrom and for subsequent reception at the receivers 112-1, 112-2, 112-3. Each of the receivers 112-1, 112-2, 112-3 may be arranged to receive, from the direction of the reflector assembly 122, respective partial reflections of the TX beam conveying the measurement signal transmitted from the transmitter 111 towards the reflector assembly 122. Aspects related to transmission, reception and characteristics of the measurement signal are described in the examples provided in the following.

FIG. 1C schematically illustrates the cover-portion-facing side of the base portion 120 according to the first example, showing the reflector assembly 122 that is divided into three identical reflector portions 122-1, 122-2, 122-3 that form a trilaterally rotationally symmetrical reflector element. In other words, the reflector assembly 122 exhibits rotational symmetry of order three. Hence, the trilaterally symmetrical arrangement of the receivers 112-1, 112-2, 112-3 on the base-portion-facing side of the cover portion 110 and the transmitter 111 arranged substantially at the center of the (conceptual) equilateral triangle formed by the receivers 112-1, 112-2, 1123 together with the trilaterally symmetrical reflector assembly 122 arranged on the cover-portion-facing side of the base portion 120 constitute a trilaterally symmetrical wind measurement arrangement. Each of the reflector portions 122-1, 122-2, 122-3 may comprise a respective concave surface for reflecting a respective portion of the measurement signal transmitted from the transmitter 111 for reception by a respective one of the receivers 112-1, 112-2, 112-3. Due to the concave surfaces of the reflector portions 122-1, 122-2, 122-3, a respective boundary between each pair of two adjacent reflector portions 122-1, 122-2, 122-3 forms a respective ridge, whereas the respective ridges between the adjacent reflector portions 122-1, 122-2, 122-3 meet at a center point of the reflector assembly 122 and from an apex. In an example, the reflector assembly 122 may be a separate element that is embedded or otherwise attached to the cover-portion-facing side of the base portion 120, whereas in another example the reflector assembly 122 may be provided as an integral part of base portion 120 e.g. such that the cover-portion-facing surface of the base portion 120 or at least part thereof is shaped such that it forms the reflector assembly 122.

In various examples, the measurement signal conveyed in the TX beam transmitted from the transmitter 111 may comprise a signal that is characteristic of the transmitter 111 or the measurement signal conveyed in the TX beam transmitted from the transmitter 111 may comprise a measurement signal supplied to the transmitter 111 for transmission therefrom. The TX beam originating from the transmitter 111 may be divergent to an extent that depends on characteristics of the transmitter 111.

The measurement signal conveyed in the TX beam transmitted from the transmitter 111 may comprise an ultrasonic signal and, hence, the transmitter 111 may comprise an ultrasonic transmitter or an ultrasonic transducer arranged to transmit the ultrasonic signal, whereas each of the receivers 112-1, 112-2, 112-3 may comprise a respective ultrasonic receiver or a respective ultrasonic transducer arranged to receive at least a portion of the ultrasonic signal transmitted from the transmitter 111. As a non-limiting example in this regard, each of the transmitter 111 and the receivers 112-1, 112-2, 112-3 may be provided as a respective piezoelectric transducer, e.g. as respective cylindrical piezoelectric transducers that radiates a relatively wide TX beam and receive a relatively wide receiver (RX) beam or as respective linear piezoelectric transducers that radiates a relatively narrow TX beam and receive a relatively narrow RX beam. Usage of the linear piezoelectric transducers may be advantageous in that they provide a cost-effective solution while providing TX and RX beams of sufficient width in view of certain advantageous characteristics of the reflector assembly 122 that includes the concave reflector portions 122-1, 122-2, 122-3 (which are described in further detail in the following).

Along the lines described in the foregoing, each of the reflector portions 122-1, 122-2, 122-3 is arranged to reflect a respective portion of the TX beam originating from the transmitter 111 towards a respective one of the receivers 112-1, 112-2, 112-3. In this regard, the reflector portion 122-1 may be provided for reflecting the respective portion of the TX beam towards the receiver 112-1 and hence the reflector portion 122-1 may be referred to as a reflector portion that is associated with the receiver 112-1 and, conversely, the receiver 112-1 may be referred to as a receiver that is associated with the reflector portion 122-1. Similar relationship applies for the reflector portion 122-2 and the receiver 112-2 as well as for the reflector portion 122-3 and the receiver 112-3, mutatis mutandis.

The schematic illustration of FIG. 1C further shows a projected position of the transmitter 111 on the reflector assembly 122 and respective projected positions 112-1', 112-2', 112-3' of the receivers 112-1, 112-2, 112-3 in relation to the arrangement of the reflector portions 122-1, 122-2, 122-3 of the reflector assembly 122. As shown in the illustration, the center point of the arrangement of receivers 112-1, 112-2, 112-3 and the center point of the reflector portion 122 are spatially aligned with each other, thereby also spatially aligning the transmitter 111 with the center point of the reflector element 122. Moreover, each of the receivers 112-1, 112-2, 122-3 may be spatially aligned with the reflector portion 122-1, 122-2, 122-3 associated therewith, e.g. such that the each of the receivers 112-1, 112-2, 112-3 is spatially aligned with a respective (conceptual) radial line segment that extends from the center point of the reflector assembly 122 towards the perimeter of the reflector assembly 122 and that bisects the reflector portion 122-1, 122-2, 122-3 associated therewith. In the present text, the term 'bisect' is applied to mean division into two parts of substantially equal size:

As an example in this regard:

the receiver 112-1 may be spatially aligned with a first (conceptual) radial line segment that bisects the reflector portion 122-1;

the receiver 112-2 may be spatially aligned with a second (conceptual) radial line segment that bisects the reflector portion 122-2;

the receiver 112-3 may be spatially aligned with a third (conceptual) radial line segment that bisects the reflector portion 122-3.

Consequently, each of the receivers 112-1, 112-2, 112-3 gets spatially aligned with a respective reference position that is at a predefined distance from the center point of the reflector assembly 122 and located on the (conceptual) radial line segment that bisects the reflector portion 122-1, 122-2, 122-3 associated therewith, where the predefined distance is substantially the same as the distance between any of the receivers 112-1, 112-2, 112-3 and the center point of the (conceptual) equilateral triangle formed by respective positions of the receivers 112-1, 112-2, 112-3. In other words, such alignment of each of the receivers 112-1, 122-2, 122-3 with respect to the associated one of the reflector portions 122-1, 122-2, 122-3 results in spatially aligning each of the receivers 112-1, 112-2, 112-3 with a respective reference position that is substantially at an equal distance from the boundaries of the associated reflector portion 122-1, 122-2, 122-3 in circumferential direction. In various examples, the respective (conceptual) radial line segment that bisects the respective one of the reflector portions 122-1, 122-2, 122-3 lies on a respective (conceptual) bisecting plane, which is substantially perpendicular to the reference plane defined by the respective positions of the receivers 112-1, 112-2, 112-3, which meets the center point of the reflector assembly 122 and which bisects the respective reflector portion 122-1, 122-2, 122-3 associated therewith. Consequently, each of the reflector portions 122-1, 122-2, 122-3 may be symmetric with respect to the respective (conceptual) bisecting plane (and with respect to the respective (conceptual) bisecting radial line segment).

In this regard, the spatial alignment between one of the receivers 112-1, 112-2, 112-3 and the respective (conceptual) line segment bisecting the associated reflector portion 122-1, 122-2, 122-3 therewith implies that a projection of the position of the respective receiver 112-1, 112-2, 112-3 along a line that is perpendicular to the reference plane defined by respective positions of the receivers 112-1, 112-2, 112-3 coincides with the respective (conceptual) line segment that bisects the associated one of the reflector portions 122-1, 122-2, 122-3. Along similar lines, the spatial alignment between the transmitter 111 and the center point of the reflector assembly 122 implies that a projection of the position of the transmitter 111 along a line that is perpendicular to said reference plane coincides with the center point of reflector assembly 122.

The transmitter 111 may be disposed in the cover portion 110 such that a respective portion of the TX beam transmitted therefrom meets respective sub-areas on surfaces of each of the reflector portions 122-1, 122-2, 122-3.

In other words, the TX beam may be transmitted from the transmitter 111 such that its 'footprint' on the reflector assembly 122 overlaps the apex at the center point of the reflector assembly 122. Consequently, a first portion of the divergent TX beam transmitted from the transmitter 111 meets a first sub-area on the surface of the reflector portion 122-1, a second portion of the TX beam meets a second sub-area on the surface of the reflector portion 122-2, and a third portion of the TX beam meets a third sub-area on the surface of the reflector portion 122-3.

According to an example, the TX beam transmitted from the transmitter 111 may have its center axis directed at a predefined TX target position within the reflector assembly 122. As an example in this regard, the TX target position may coincide with the center point of the reflector assembly 122 (e.g. the apex therein), whereas in another example the TX target position may be another position of the reflector assembly 122 in proximity of the center point of the reflector assembly 122. As an example in this regard, the hatched circular area in the schematic illustration of FIG. 1C depicts the 'footprint' of the TX beam on the reflector assembly 122, also showing the respective (first, second and third) sub-areas on the surfaces of the reflector portions 122-1, 122-2, 122-3 met by the TX beam transmitted from the transmitter 112. Hence, with the center axis of the TX beam directed at the TX target position located at or close to the apex at the center of the reflector assembly 122, the ridges formed at the respective boundaries between the adjacent reflector portions 122-1, 122-2, 122-3 serve to split the TX beam into the first, second and third portions of substantially equal size for reflection from the reflector assembly 122, respectively, to the reflector portions 122-1, 122-2 and 122-3.

It is worth noting that the schematic illustration of FIG. 1C serves as a conceptual example regarding the (first, second and third) sub-areas of the reflector portions 122-1, 122-2, 122-3 met by the TX beam transmitted from the transmitter 111 with respect to the apex provided at the center of the reflector assembly 122. In various implementations of the wind measurement apparatus 100 the (first, second and third) sub-areas of the reflector portions 122-1, 122-2, 122-3 met by the TX beam may have a size that is different (e.g. larger) in comparison to that shown in the illustration of FIG. 1C, depending e.g. on the distance between the cover portion 110 and the base portion 120, on characteristics of the reflector portions 122-1, 122-2, 112-3, on respective characteristics of the transmitter 111 and the receivers 112-1, 112-2, 112-3, on the distances between the transmitter 110 and each of the receivers 112-1, 112-2, 112-3 and/or on the TX target position applied for the TX beam transmitted from the transmitter 111.

Respective orientations of the transmitter 111 and the receivers 112-1, 112-2, 112-3 with respect to the cover portion 110 depend e.g. on the TX target position applied for the TX beam, on respective RX target positions applied for the receivers 112-1, 112-2, 112-3 and/or on characteristics of the reflector portions 122-1, 122-2, 122-3. Since the TX target position is at or close to the apex at the center of the reflector assembly 122, the (substantially planar) front face of the transmitter 111 is typically substantially parallel with the reference plane defined by respective positions of the receivers 112-1, 112-2, 112-3. Each of the receivers 112-1, 112-2, 112-3 is oriented such that its (substantially planar) front face is substantially perpendicular to a (conceptual) line connecting the center point of the front face of the respective receiver 112-1, 112-2, 112-3 and a respective RX target position located within the reflector portion 122-1, 122-2, 122-3 associated with the respective receiver 112-1, 112-2, 112-3, thereby steering the center axis of a RX beam of the respective receiver 112-1, 112-2, 112-3 towards the respective RX target position. In this regard, the respective RX target positions preferably reside within the respective (first, second and third) sub-areas of the reflector portions 122-1, 122-2, 122-3 met by the TX beam transmitted from the transmitter 111. Consequently, at least in some examples the receivers 112-1, 112-2, 112-3 may be arranged in the cover portion 110 in orientations where their respective front faces are inclined with respect to the reference plane defined by respective positions of the receivers 112-1, 112-2, 112-3.

If considering the reflection of the TX beam transmitted from the transmitter 111 towards the TX target position, along the lines described in the foregoing, a first TX beam portion may meet the first sub-area on the surface of the reflector portion 122-1, a second TX beam portion may meet of the second sub-area on the surface of the reflector portion 122-2 and a third TX beam portion may meet the third sub-area on the surface of the reflector portion 122-3. Consequently, due to the respective ridges formed at the respective boundaries between the reflector portions 122-1, 122-2, 122-3 and the apex formed at the center point of the reflector assembly 122, the first TX beam portion may be reflected from the reflector portion 122-1 towards the receiver 112-1, the second TX beam portion may be reflected from the reflector portion 122-2 towards the receiver 112-2, and the third TX beam portion may be reflected from the reflector portion 122-3 towards the receiver 112-3, each of the receivers 112-1, 112-2, 112-3 thereby receiving via the reflector assembly 122 a respective partial reflection of the TX beam transmitted from the transmitter 111. Hence, the ridges at the respective boundaries between the reflector portions 122-1, 122-2, 122-3 and the apex formed at the center point of the reflector assembly 122 serve to split the TX beam into three TX beam portions of substantially equal size, thereby also splitting the signal power conveyed in the TX beam originating from the transmitter 111 into three substantially equal portions and transferring each third of the signal power towards the respective one of the receivers 112-1, 112-2, 112-3.

Still referring to the first example, if considering reflection of the first TX beam portion from the reflector portion 122-1 towards the receiver 112-1, the concave shape of the reflector portion 122-1 facilitates converging reflection of the first TX beam portion towards the receiver 112-1 from a relatively large sub-area of the reflector portion 122-1 (in comparison to a reflector having a substantially planar surface), whereas similar considerations apply to reflection of the second TX beam portion from the reflector portion 122-2 towards the receiver 112-2 and to reflection of the third TX beam portion from the reflector portion 122-3 towards the receiver 112-3, mutatis mutandis.

Therefore, the concave shape of the reflector portions 122-1, 122-2 and 122-3 may further allow for some freedom in orientation of the transmitter 111 with respect to the reference plane and/or exact location of the TX target position in relation to the apex at the center point of the reflector assembly 122 while still ensuring reception of the measurement signal conveyed in the respective one of the first, second and third TX beam portions at a sufficient signal power at the respective one of the receivers 112-1, 112-2, 112-3 to enable uncompromised measurement performance.

As described in the foregoing, each of the reflector portions 122-1, 122-2, 122-3 may be provided as a respective concave reflector, where each of the reflector portions 122-1, 122-2, 122-3 may have, for example, a substantially ellipsoidal shape. In this regard, the respective surface of each of the reflector portions 122-1, 122-2, 122-3 may have a substantially ellipsoidal curvature that is defined by a portion of an underlying ellipsoid, and hence the surfaces of the reflector portions 122-1, 122-2, 122-3 may have a shape of a predefined ellipsoidal cap of the underlying ellipsoid or a part thereof. In the present disclosure, in the interest of clarity and brevity of description, such shape of the reflector portions 122-1, 122-2, 122-3 may be also referred to as an ellipsoidal shape, even though only a portion of the underlying ellipsoid is meant. While the present disclosure frequently applies a substantially ellipsoidal reflector shape as an example of the concave reflector surface, the substantially ellipsoidal shape serves as a non-limiting example and in other examples a different concave reflector shape may be applied instead, such as a substantially spherical shape defined via a portion of a sphere or a substantially paraboloidal concave shape defined via a portion of a paraboloid. Further exemplifying characteristics of the concave shape of any of the reflector portions 122-1, 122-2, 122-3 and its position with respect to associated one of the receivers 112-1, 112-2, 112-3 are described in the following with references to the reflector portion 122-1 and its position with respect to the position of the receiver 112-1. Similar considerations are valid also for the concave shape of the reflector surface of reflector portion 122-2 and its position with respect to the position of the receiver 112-2 as well as for the concave shape of the reflector surface of reflector portion 122-3 and its position with respect to the position of the receiver 112-3, mutatis mutandis.

In an example, the dependency between the concave shape and position of the reflector surface of the reflector portion 122-1 and the respective positions of the transmitter 111 and the receiver 112-1 may be defined as follows: the center points of the respective front faces of the transmitter 111 and the receiver 112-1 may be positioned at respective locations that are at a substantially equal distance from a reference axis that is normal to the reference plane defined by respective locations of the receivers 112-1, 112-2, 112-3 and that intersects and bisects a (conceptual) reference line segment connecting the center points of the respective front faces of the transmitter 111 and the receiver 112-1, whereas the reference axis meets the reflector surface at a normal angle (i.e. the reference axis is perpendicular to a tangent plane of the reflector surface at the point where the reference axis intersects the reflector surface). In the present disclosure, the point of the reflector surface at which the reference axis meets the reflector surface is also referred to as a zero-gradient point. In a variation of such a reflector surface design, the reference axis may intersect the (conceptual) reference line segment in a position that is offset from its midpoint that is at substantially the same distance from respective positions of the transmitter 111 and the receiver 112-1.

According to an example, the reflector surface may be symmetrical with respect to a plane defined by the above-described reference axis and the (conceptual) reference line segment. In this regard, the said plane may coincide with or define the respective (conceptual) bisecting plane described in the foregoing, thereby resulting in the reflector surface that is symmetrical with respect to the respective (conceptual) bisecting plane that bisects the reflector portion 122-1 and, consequently, symmetrical with respect to the respective (conceptual) radial line segment that bisects the reflector portion 122-1.

According to an example, the reflector surface may be defined as a concave cap of the underlying concave surface, separated from the underlying concave surface by a surface normal of its center axis. As non-limiting examples in this regard, the underlying concave surface may comprise a surface that is symmetrical with respect to its center axis, whereas the above-described reference axis may coincide with the center axis of the underlying concave surface. Examples of such symmetrical surfaces include an ellipsoid, a spheroid, or a paraboloid, whereas the transmitter 111 and the receiver 112-1 are preferably positioned within the underlying concave surface.

Such shape and positioning of the reflector surface with respect to the respective locations of the transmitter and the receiver 112-1 (and/or such positioning of the transmitter 111 and the receiver 112-1 with respect to the shape and position of the reflector surface) provides a consistent path between the transmitter 111 and the receiver 112-1 via reflection from the reflector portion 122-1 substantially regardless of the distance between the above-described reference plane and the zero-gradient point of the reflector surface. In measurement conditions where the general direction of the airflow through the measurement volume is substantially parallel to the reference plane (as in case of the wind measurement apparatus 100), the consistent path substantially guarantees that, regardless of the speed and direction of the airflow and regardless of the shape of the reflector surface around the zero-gradient point, a measurement signal originating from the transmitter 111 that meets the zero-gradient point is received at the receiver 112.

Moreover, due to the concave shape of the reflector portion also the measurement signals originating from the transmitter 111 and that meet a sub-area of the reflector surface around the zero-gradient point (e.g. the first sub-area described in the foregoing) are likewise received at the receiver 112, where the size of the sub-area is dependent on the curvature of the reflector surface.

The spatial relationship between the respective positions of the transmitter 111 and the receiver 112-1 and the shape of the concave reflector surface of the reflector portion 122-1 described above generalizes into defining the concave reflector surface of a given one of the reflector portions 122-1, 122-2, 122-3 to follow the shape of a portion of an underlying concave surface such that a respective reference axis meets the reflector surface at a normal angle, where the respective reference axis is substantially perpendicular to the reference plane defined by the respective locations of the receivers 112-1, 112-2, 112-3 and it intersects (e.g. bisects) the (conceptual) reference line segment connecting the transmitter 111 to the receiver 112-1, 112-2, 112-3 that is associated with the given one of the reflector portions 122-1, 122-2, 122-3 at a position that is substantially at an equal distance from respective positions of the transmitter 111 and said receiver 112-1, 112-2, 112-3. Herein, the reflector surface may be defined as a concave cap of the underlying concave surface, where the concave cap is separated from the underlying concave surface by a surface normal of its center axis. As an example in this regard, the underlying concave surface defining the shape of a given one of the reflector portions 122-1, 122-2, 122-3 may comprise a surface that is symmetrical with respect to its center axis, such as an ellipsoid, a spheroid, or a paraboloid, whereas the transmitter 111 and the receiver 112-1, 112-2, 112-3 associated with the respective one of the reflector portions 122-1, 122-2, 122-3 are preferably positioned within the underlying concave surface.

The portion of the underlying concave surface that defines the shape of the respective reflector portion 122-1, 122-2, 122-3 may be chosen in consideration of characteristics and direction of the TX beam transmitted from the transmitter 111, e.g. in consideration of the extent of divergence of the TX beam and further in consideration of the TX target position applied for the TX beam and the respective RX target position applied for the respective RX beams of the receivers 112-1, 112-2, 112-3. In this regard, the reflector surfaces may be made sufficiently large to ensure receiving the TX beam substantially in its entirety at the chosen distance between the cover portion 110 and the base portion 120, possibly further accounting for any spatial shifting of the TX beam that may occur due to wind at wind speeds of interest.

In an example where the reflector surface has a substantially ellipsoidal shape, the reflector portion 122-1 may be defined as a portion of a (conceptual) underlying ellipsoid having its first principal axis connecting the center points of the respective front faces of the transmitter 111 and the receiver 112-1 and having its center point at a position that is substantially at an equal distance from the center points of the respective front faces of the transmitter 111 and the receiver 112-1. Consequently, the zero-gradient point may comprise an endpoint of a second principal axis of the underlying ellipsoid whereas a plane defined by the first principal axis and a third principal axis of the underlying ellipsoid coincides with the reference plane defined by (the center points of the respective front faces of) the receivers 112-1, 112-2, 112-3 and a plane define by the first principal axis and the second principal axis define the respective (conceptual) bisecting plane for the reflector portion 122-1 to be spatially aligned with the receiver 112-1.

Considering the relationship between the shape of the ellipsoidal surface of the reflector portion 122-1 and the respective positions of the transmitter 111 and the receiver 112-1 in view of the ellipsoid illustrated in FIG. 2, the center points of the respective front faces of the transmitter 111 and the receiver 112-1 may be positioned on the principal axis b at a distance D from the center point of the underlying ellipsoid (shown as a dot where the principal axes a, b and c meet) at opposite sides of the center point, whereas the zero-gradient point may be one of the endpoints of the principal axis c, the plane defined by the principal axes a and b may be the one that coincides with the reference plane, and the plane defined by the principal axes b and c may be the one that defines the respective (conceptual) bisecting plane. In a variation of this example, the center points of the respective front faces of the transmitter 111 and the receiver 112-1 may be offset by a predefined distance from the plane defined by the principal axes a and b (i.e. along the principal axis c). In both these examples the portion of the underlying ellipsoid that defines the shape of ellipsoidal surface of the reflector portion 122-1 may be chosen in consideration of respective characteristics and direction of the TX beam of the transmitter 111 and/or the RX beam of the receiver 112-1. Similar considerations apply to defining respective ellipsoidal concave surfaces for the reflector portions 112-2 and 112-3 as well, mutatis mutandis.

It should be noted that the relationship between the substantially ellipsoidal shape of the reflector portions 122-1, 122-2, 122-3 and the respective positions of the associated receivers 112-1, 112-2, 112-3 in relation to the position of the transmitter 111 described above is a non-limiting one and in other examples the spatial relationship between the respective positions of the receivers 112-1, 112-2, 112-3 in relation to the position of the transmitter 111 and the shape and position of the ellipsoidal reflector surface may be defined in a different manner while still providing advantageous reflection characteristics described in the present disclosure.

The examples above (implicitly) define the structure of the trilaterally symmetrical wind measurement arrangement and hence the structure of the wind measurement apparatus 100 in this regard via first defining the respective positions of the transmitter 111 and the receivers 112-1, 112-2, 112-3 on the base-portion-facing side of the cover portion 110 and applying the respective positions chosen for the transmitter 111 and for the receivers 112-1, 112-2, 112-3 to define the concave shapes of the reflector surfaces of the reflector portions 122-1, 122-2, 122-3 and their positions with respect to the transmitter 111 and the receivers 112-1, 122-2, 122-3 in accordance with the relationship described above, thereby also (at least indirectly) defining the distance between the cover portion 110 and the base portion 120. According to another example, the design procedure of the of the trilaterally symmetrical wind measurement arrangement and, consequently, the structure of the wind measurement apparatus 100, may involve first defining the concave shapes of the reflector surfaces of the reflector portions 122-1, 122-2, 122-3 and subsequently defining the respective positions of the transmitter 110 and the receivers 112-1, 112-2, 112-3 with respect to their associated reflector portions 122-1, 122-2, 122-3 in accordance with the relationship described above, thereby also (at least indirectly) defining the distance between the cover portion 110 and the base portion 120. The design of the wind measurement arrangement in terms of respective positions of the transmitter 111 and the receivers 112-1, 112-2, 112-3 and the respective positions and shapes of the reflector portions 122-1, 122-2, 122-3 associated therewith may be carried out e.g. by an experimental procedure via usage of suitable simulation tool(s) in order to find the respective positions of the transmitter 111 and the receivers 112-1, 112-1, 112-3, their orientation with respect the reflector assembly 122 and the shapes for the concave reflector portions 122-1, 122-2, 122-3 that provide a desired performance in consideration of any design constraints e.g. in terms of size of the wind measurement apparatus 100.

Figure 3:
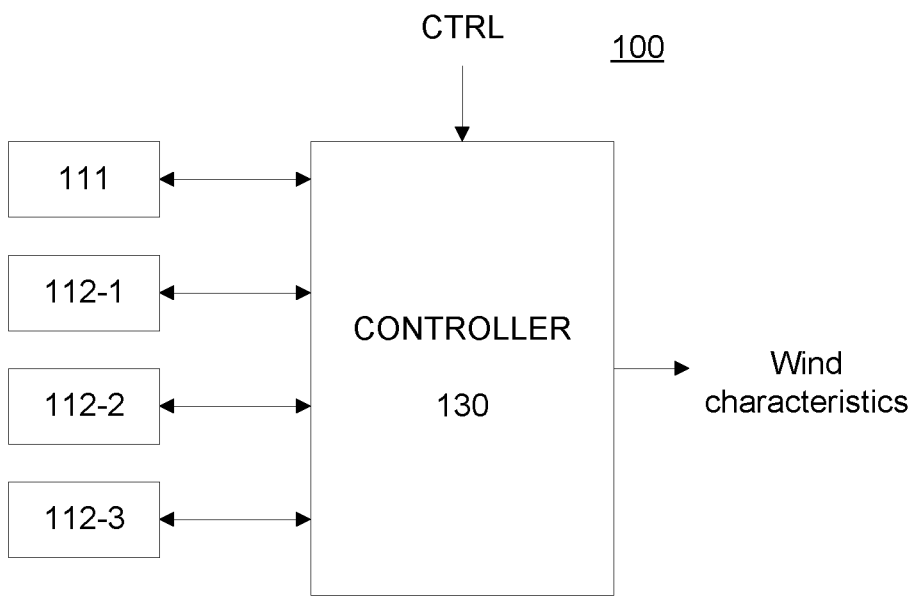
FIG. 3 illustrates a block diagram of some elements of a wind measurement apparatus according to an example.

FIG. 3 illustrates a block diagram of some (logical) elements of the wind measurement apparatus 100 according to the first example. In this regard, FIG. 3 illustrates the transmitter 111, the receivers 112-1, 112-2, 112-3 and a control portion 130. The control portion 130 may control at least some aspects of operation of the transmitter 110 and the receivers 112-1, 112-2, 112-3, e.g. transmission of the measurement signal from the transmitter 111 in form of the TX beams and capturing of reflected measurement signals based on reflections of the (first, second and third) TX beam portions received at the receivers 112-1, 112-2, 112-3. Moreover, the control portion 130 may derive one or more wind characteristics based on respective propagation delays of the measurement signal from the transmitter 111 to the receivers 112-1, 112-2, 112-3, e.g. based on time delays between transmission of the measurement signal from the transmitter 111 and its reception at the receivers 112-1, 112-2, 112-3, thereby providing a time-of-flight based wind measurement. The control portion 130 may receive control input (CTRL) via a user interface or from another apparatus and the control portion 130 may output at least part of the derived wind characteristics via the user interface or to another apparatus.

As described in the foregoing, the measurement signals conveyed in the TX beam may comprise ultrasonic signals that may be characteristic to the applied transmitter 111 or that may be supplied for transmission in the TX beam by the transmitter 111. In the former scenario, the control portion 130 may operate the transmitter 111 to transmit the measurement signal according to a predefined schedule, whereas in the latter scenario, the control portion 130 may provide the transmitter 111 with the respective measurement signal for transmission therefrom according to the predefined schedule. In this regard, the measurement signals conveyed in the TX beam may convey a certain waveform, e.g. a pulse or a sequence of pulses, at ultrasonic frequencies and, consequently, the propagation time of the measurement signal from the transmitter 111 to one of the receivers 112-1, 112-2, 112-3 may be conveniently determined at the control portion 130 via matching the respective pair of the certain waveform in the measurement signal transmitted from one of the transmitter 111 and its 'copy' in the measurement signal captured at the respective one of the receivers 112-1, 112-2, 112-3. Such an approach for measurement of wind characteristics such as wind speed and/or wind direction in general is known in the art and hence further details in this regard are not provided in the present disclosure.

The trilaterally symmetric wind measurement arrangement of the wind measurement apparatus 100 according to the first example enables substantially simultaneous measurement on three measurement paths via usage of the single transmitter 111 and the three receivers 112-1, 112-2, 112-3. This aspect is schematically illustrated via FIG. 4 that shows measurements paths $P_1$, $P_2$, $P_3$ from the transmitter 111 to each of the receivers 112-1, 112-2, 112-3, where $P_m$ denotes a transmission path from the transmitter 111 to the receiver 112-$m$ via the associated reflector portion 122-$m$ (i.e. one of the reflector portions 122-1, 122-2, 122-3).

Along the lines described above, the aspect of the reflector assembly 122 serving to split the measurement signal transmitted from the transmitter 111 for reception by each of the receivers 112-1, 112-2, 112-3 enables simultaneous measurement from three measurement paths via usage of only single transmitter, thereby enabling accurate, reliable and robust arrangement for wind measurement via usage of a relatively small number of components and, consequently, providing a cost-effective approach for wind measurement. Moreover, the concave shape (e.g. substantially ellipsoidal shape) of the reflector portions 122-1, 122-2, 122-3 enables a relatively short measurement distance (i.e. the distance between the cover portion 110 and the base portion 120), thereby allowing for relatively small size of the wind measurement apparatus 100, which is advantageous in a majority of usage scenarios.

Another advantage of the trilaterally symmetrical wind measurement arrangement applied in the wind measurement apparatus 100 according to the first example is simultaneous focusing and amplification of the measurement signal conveyed in the TX beam and automatic directional correction, which both are consequences of the concave shape of the reflector portions 122-1, 122-2, 122-3:

Due to the concave shape of the reflector portions 122-1, 122-2, 122-3, signal components conveyed in the respective (first, second and third) TX beam portions originating from the transmitter 111 are reflected towards the associated receiver 112-1, 112-2, 112-3 from a relatively large sub-area of the respective reflector portion 122-1, 122-2, 122-3 (e.g. in comparison to a reflector having a substantially planar surface). While this characteristic of the reflector portions 122-1, 122-2, 122-3 allows for some freedom in choosing the TX target position for the TX beam (as described in the foregoing), it also serves to provide directional correction e.g. in a scenario where the TX beam misses the TX target position e.g. due to strong wind, due to minor irregularities in the shape of the reflector surface of the reflector portion 122-1, 122-2, 122-3 due manufacturing tolerances, or due to (minor) structural damage caused to the wind measurement apparatus 100.

Due to the concave shape of the reflector portions 122-1, 122-2, 122-3, the propagation time of the signal components conveyed in the respective TX beam portions from the transmitter 111 to the respective receivers 112-1, 112-2, 112-3 is substantially similar regardless of the position of the associated reflector portion 122-,1 122-2, 122-3 serving to reflect these signal components, thereby allowing for flexible design of the wind speed measurement arrangement in terms of the TX target position and RX target positions on the respective reflector portion 122-1, 122-2, 122-3. Another advantage arising from this characteristic of the concave reflector portions 122-1, 122-2, 122-3 is that the signal components across the respective TX beam portion arrive at the associated receiver 112-1, 112-2, 112-3 substantially simultaneously, thereby amplifying the received measurement signal e.g. in comparison to a scenario that applies direct transmission of the TX beam from the transmitter 111 to the receivers 112-1, 112-2, 112-3 or to one that applies a reflector having a substantially planar surface. Such amplification may be especially advantageous for (more than) compensating for the loss of signal power that occurs due to splitting the TX beam transmitted from the transmitter 110 into the first, second and third beam portions by the ridges and the apex formed on the reflector assembly 122.

FIGS. 5A and 5B schematically illustrate some components of a wind measurement apparatus 100 according to a second example. As in the first example described in the foregoing, also in the second example the wind measurement apparatus 100 comprises the cover portion 110 and the base portion 120 arranged at a distance from each other to form a gap that allows for an airflow between the cover portion 110 and the base portion 120. The wind measurement apparatus 100 according to the second example is similar to the first example in operational characteristics and structure, apart from the different number of receivers and the different number of reflector portions: in the second example the base-portion-facing side (e.g. on the cover-portion-facing surface) of the cover portion 110 is provided with an arrangement of the single transmitter 111 and four receivers 112-1, 112-2, 112-3 and 112-4, whereas the reflector assembly 122 on the cover-portion-facing side (e.g. the cover-portion-facing surface) of the base portion 120 includes four substantially identical concave reflector portions 122-1, 122-2, 122-3 and 122-4 and it exhibits rotational symmetry of order four, thereby constituting a quadrilaterally symmetrical wind measurement arrangement FIG. 5A schematically illustrates the base-portion-facing side of the cover portion 110 according to the second example, showing the transmitter 111 together with the receivers 112-1, 112-2, 112-3, 112-4 that are arranged at respective positions that correspond to respective vertices of a (conceptual) square arranged on the cover-portion-facing side of the cover portion 110, thereby constituting a quadrilaterally symmetrical arrangement of the receivers 112-1, 112-2, 112-3, 112-4 on the base-portion-facing side of the cover portion 110. The transmitter 110 may be arranged in a position that is at a substantially equal distance from each of the receivers 112-1, 112-2, 112-3, 112-4. As an example in this regard, the transmitter 111 may be disposed on an axis that meets the reference plane defined by the respective positions of the receivers 112-1, 112-2, 112-3, 112-4 in a normal angle substantially at the center point of the (conceptual) square formed by the receivers 112-1, 112-2, 112-3, 112-4, e.g. substantially on the reference plane or (slightly) offset from the reference plane, either towards the base portion 120 or further away from the base portion 120.

As another way of specifying the arrangement of the receivers 112-1, 112-2, 112-3, 112-4 on the base-portion-facing side of the cover portion 110, the receivers 112-1, 112-2, 112-3, 112-4 may be disposed at respective positions that are evenly spread (i.e. evenly spaced) on a (conceptual) circle on the base-portion-facing side of the cover portion 110, whereas the axis on which the transmitter 111 is disposed may be a normal of the reference plane that meets the reference plane substantially at the center point of the (conceptual) circle.

As described in the foregoing, in the second example the reflector assembly 122 includes a quadrilaterally symmetrical arrangement of the reflector portions 122-1, 122-2, 122-3, 122-4, where each of the reflector portions 122-1, 122-2, 122-3, 122-4 may comprise a respective concave surface for reflecting measurement signals transmitted from the transmitter 111 for reception by the receiver 112-1, 112-2, 112-3, 112-4 associated therewith. As in the case of the first example, also in the second example a respective boundary between each pair of two adjacent reflector portions 122-1, 122-2, 122-3, 122-4 forms a respective ridge due to the concave shapes of the reflector portions 122-1, 122-2, 122-3, 122-4, whereas the ridges meet at a center point of the reflector assembly 122 and from an apex.

As in case of the first example, also in the second example each of the receivers 112-1, 112-2, 112-3, 112-4 may be spatially aligned with a respective (conceptual) radial line segment that extends from the center point of the reflector assembly 122 towards the perimeter of the reflector assembly 122 and that bisects the reflector portion 122-1, 122-2, 122-3, 122-4 associated with the respective one of the receivers 112-1, 112-2, 112-3, 112-4. In other words, each of the receivers 112-1, 112-2, 112-3, 112-4 may be spatially aligned with respect to a respective (conceptual) bisecting plane that is substantially perpendicular to the reference plane, that meets the center point of the reflector assembly 122 and that bisects the associated one of the reflector portions 122-1, 122-2, 122-3, 122-4.

Still referring to the second example, the transmitter 111 may be arranged to transmit the TX beam such that its center axis is directed at the TX target position located at or in proximity of the apex in the reflector portion 122, which results in respective portions of the TX beam meeting respective sub-areas in each of the reflector portions 122-1, 122-2, 122-3, 122-4. Consequently, the arrangement of ridges and the apex on the surface of the reflector assembly 122 results in splitting the TX beam into first, second, third and fourth TX beam portions for reflection, respectively, from the respective reflector portions 122-1, 122-2, 122-3, 122-4 towards the associated receivers 112-1, 112-2, 112-3, 112-4.

Aspects that relate to other characteristics of structure and operation of the wind measurement apparatus 100 according to the second example, e.g. ones related to general structure of the reflector assembly 120 and the reflector portions 122-1, 122-2, 122-3, 122-4 therein, to the concave shape (e.g. the substantially ellipsoidal shape) of the reflector portions 122-1, 122-2, 122-3, 122-4 in dependence of the respective positions of the transmitter 111 and the receivers 112-1, 112-2, 112-3, 112-4 (or vice versa), to respective orientations of the transmitter 111 and the receivers 112-1, 112-2, 112-3, 112-4 with respect to the cover portion 110 as well as to general operation of the wind measurement apparatus 100 under control of the control portion 130 may be provided in a manner described in the foregoing in context of the first example, mutatis mutandis.

The quadrilaterally symmetric wind measurement arrangement of the wind measurement apparatus 100 according to the second example enables substantially simultaneous measurement on four measurement paths of substantially equal length. Hence, an advantage of the wind measurement apparatus 100 according to the second example over the wind measurement apparatus 100 according to the first example is further improved accuracy and reliability of the wind measurement due to increased number of measurement paths, while on the other hand introduction of the fourth receiver increases the number of components required for the wind measurement apparatus 100 and hence results in a slightly more complex design.

The first example that relies on the trilaterally symmetrical wind measurement arrangement and the second example that relies on the quadrilaterally symmetrical wind measurement arrangement readily generalize into a wind measurement apparatus 100 according a third example that applies a symmetrical wind measurement arrangement of order N (i.e. a N-laterally rotationally symmetrical wind measurement arrangement), where the order N is larger than or equal to three. Hence, the third example implicitly encompasses the first and second example. The wind measurement apparatus 100 according to the third example has the advantageous characteristics described in the foregoing for the trilaterally symmetrical wind measurement arrangement according to the first example while providing further improvement in terms of accuracy and reliability of the wind measurement with increasing value of N. Such a measurement arrangement includes an arrangement of the single receiver and N receivers together with the reflector assembly 122 that is divided into N substantially identical reflector portions. In this regard, the N receivers may be jointly referred to via a reference number 112, any of the N receivers may be referred to via a reference number 112-n, while any of the N reflector portions may be referred to via a reference number 122-n. The arrangement of the N receivers 112 arranged in the cover portion 110 with respect to the N reflector portions 122-n of the reflector assembly 122 provided in the base portion 120 (or vice versa) may be characterized e.g. in the following manner:

an arrangement of N receivers 112 may be arranged in the base-portion-facing side (e.g. on the base-portion-facing surface) of the cover portion 110 in respective positions that serve as respective vertices of a convex regular polygon of the order N;

the reflector assembly 122 may be arranged on the cover-portion-facing side (e.g. on the cover-portion-facing surface) of the base portion 120, wherein the reflector assembly 122 is divided into N substantially identical concave reflector portions 122-n, the reflector assembly 122 thereby exhibiting rotational symmetry of the order N; and the reflector assembly 122 and the cover portion 110 may be disposed with respect to each other such that each of the N receivers 112-n is spatially aligned with a respective (conceptual) radial line segment that extends from the center point of the reflector assembly 122 towards the perimeter of the reflector assembly 122 and that bisects the reflector portion 122-n associated with the respective one of the receivers 112-n.

As described in the foregoing in context of the first and second examples, also in the third example the alignment of the receivers 112-n with respect to the respective (conceptual) bisecting line segments may be also defined via alignment with respect to respective (conceptual) bisecting planes, i.e. each of the receivers 112-n may be spatially aligned with respect to a respective (conceptual) bisecting plane that is substantially perpendicular to the reference plane, that meets the center point of the reflector assembly 122 and that bisects the associated one of the reflector portions 122-n.

Still referring to the third example, the transmitter 111 may be arranged to transmit the TX beam such that its center axis is directed at the TX target position located at or in proximity of the apex in the reflector portion 122, which results in respective portions of the TX beam meeting respective sub-areas in each of the reflector portions 122-n. Consequently, the arrangement of ridges and the apex on the surface of the reflector assembly 122 results in splitting the TX beam into N TX beam portions for reflection from the respective reflector portions 122-n towards the associated receivers 112-n.

Aspects that relate to other characteristics of structure and operation of the wind measurement apparatus 100 according to the third example, e.g. ones related to general structure of the reflector assembly 120 and the reflector portions 122-n therein, to the concave shape (e.g. the substantially ellipsoidal shape) of the reflector portions 122-n in dependence of the respective positions of the transmitter 111 and the receivers 112-n (or vice versa), to respective orientations of the transmitter 111 and the receivers 112-n with respect to the cover portion 110 as well as to general operation of the wind measurement apparatus 100 under control of the control portion 130 may be provided in a manner described in the foregoing in context of the first and/or second examples, mutatis mutandis.

In general, increasing N, i.e. increasing the number of the receivers 112-$n$ and the number of reflector portions 122-$n$ in the reflector assembly 122, basically results in further improvements in accuracy and reliability of the wind measurement via increasing the number of measurement paths, while on the other hand it results in increasing the number of components required for the wind measurement apparatus 100 and in more complex design. Consequently, the most expedient number of the receivers 112-$n$ and the reflector portions 122-$n$ to be applied in the wind measurement arrangement of the wind measurement apparatus 100 may depend on the intended usage of the wind measurement apparatus 100 and/or on requirements and/or constraints set for the accuracy and reliability of the wind measurement, for the size of the wind measurement apparatus 100, for the manufacturing cost of the wind measurement apparatus 100, etc.

The examples described in the foregoing generally refer to substantially simultaneous measurement carried out on multiple measurement paths, which enables accurate and reliable wind measurements. In the course of operation of the wind measurement apparatus 100, the control portion 130 may operate the transmitter 111 to periodically transmit the measurement signal in the TX beam. In this regard, the transmission of the measurement signals from the transmitter 111 may be carried out according to a predefined schedule, typically at predefined time intervals, where the time delay between two successive transmissions of the measurement signal from the transmitter 111 may be referred to as a measurement interval. In this regard, the shorter measurement interval may result in improved measurement performance in terms of the ability to track any changes in wind characteristics without undue delay while it may result in increasing the computation required in operation of control portion 130 to derive the one or more wind characteristics.

The examples described in the foregoing refer to the arrangement of the receivers 112-$n$ and the associated reflector portions 122-$n$ of the reflector assembly 122 such that each of the receivers 112-$n$ is spatially aligned with the respective (conceptual) bisecting plane (or the respective (conceptual) bisecting line segment), which may also serve as a symmetry plane for the respective reflector portion 122-$n$. In other examples, the plane that defines the alignment between the receiver 112-$n$ and the associated reflector portion 122-$n$ may not be the one that bisects (i.e. divides into two parts of substantially equal size) but a (conceptual) dividing plane that is substantially perpendicular to the reference plane defined by the respective positions of the receivers 112, that meets the center point of the reflector assembly 122 and that divides the respective reflector portion 122-$n$ into two parts of substantially unequal size. In this regard, each of the reflector portions 122-$n$ may be symmetric with respect to the respective (conceptual) dividing plane.

The examples described in the foregoing refer to the reflector assembly 122 being divided into N concave reflector portions 112-$n$ that are substantially identical to each other. According to another example, the reflector portions 122-$n$ may not be substantially identical to each other. As an example in this regard, the reflector portion may include a first reflector portion 122-$n1$ and a second reflector portion 122-$n2$ that have respective concave shapes different from each other, e.g. such that in the first reflector portion 122-$n1$ the zero-gradient point is closer to the center point of the reflector assembly 122 than that of the second reflector portion 122-$n1$ and/or such that one or more sub-areas of the first reflector portion 122-$n1$ have a curvature different from spatially corresponding sub-areas of the second reflector portion 122-$n2$.

The examples described in the foregoing (at least implicitly) assume symmetrical shape of the reflector portions 122-$n$ such that they are symmetrical with respect to the respective (conceptual) bisecting line segment or with respect to the respective (conceptual) bisecting or dividing plane applied as the reference point for spatial alignment between the receivers 112-$n$ and the respective associated reflector portions 122-$n$. According to another example, at least some of the reflector portions 122-$n$ may exhibit symmetry with respect to a plane that is offset from the respective (conceptual) bisecting line segment or with respect to the respective (conceptual) bisecting or dividing plane applied as the reference point for spatial alignment between the receivers 112-$n$ and the respective associated reflector portions 122-$n$, whereas in a further example at least some of the reflector portions 122-$n$ may not exhibit symmetry with respect to any (conceptual) bisecting or dividing plane of the kind described in the foregoing.

The examples described in the foregoing refer to concave shape of the reflector portions 122-$n$ of the reflector assembly 122. In this regard, the concave shape of the reflector portion 122-$n$ implies concave shape at least in those areas of the respective reflector surfaces of the reflector portions 122-$n$ that are intended for reception and reflection of the respective TX beam portions of the TX beam originating from the transmitter 111. According to an example, the reflector portions 122-$n$ in their entirety may exhibit the concave shape of the kind described in the foregoing, whereas in other examples the reflector portions 122-$n$ outside the areas intended for reception and reflection of the respective TX beam portions may exhibit concave curvature different from the kind described in the foregoing and/or they may exhibit non-concave shape. As an example of the latter, the areas of the reflector portions 122-$n$ outside the ones intended for reception and reflection of the respective TX beam portions may involve a substantially planar shape. Regardless of the curvature of the reflector portions 122-$n$ outside the areas intended for reception and reflection of the respective TX beam portions, the overall shape of the reflector portions 122-$n$ may serve as a monotonically descending 'slope' from the center of the reflector assembly 122 towards the perimeter of the reflector assembly 122 (when the wind measurement apparatus 100 is in its upright position with the reflector assembly 122 facing upwards), thereby avoiding water building up on those areas of the reflector portions 122-$n$ intended for reception and reflection of the respective TX beam portions. Further in this regard, the perimeter of the reflector assembly 122 may be open or it may be provided with one or more openings that allow for any water falling on the reflector portions 122-$n$ flowing away from the reflector assembly 122.

Figure 6:
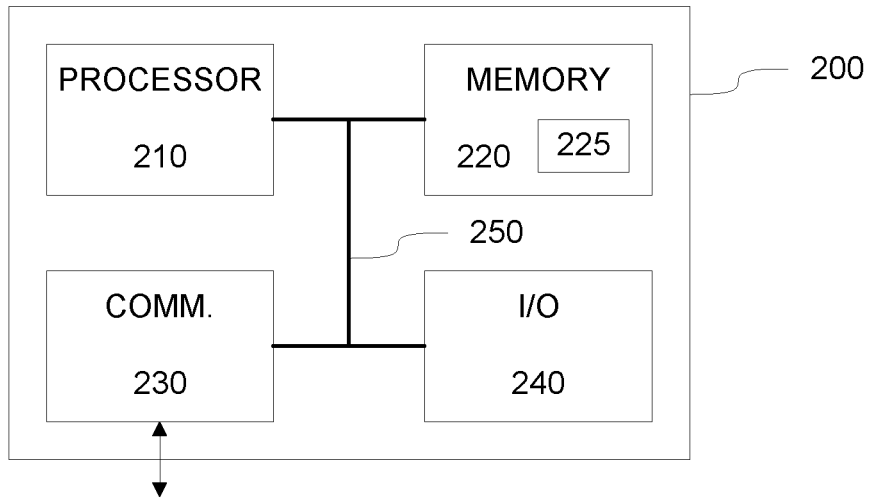
FIG. 6 illustrates a block diagram of some components of an apparatus according to an example.

FIG. 6 illustrates a block diagram of some components of an apparatus 200 that may be employed to implement operations described in the foregoing with references to the control portion 130. The apparatus 200 comprises a processor 210 and a memory 220. The memory 220 may store data and computer program code 225. The apparatus 200 may further comprise communication means 230 for wired or wireless communication with other apparatuses and/or user I/O (input/output) components 240 that may be arranged, together with the processor 210 and a portion of the computer program code 225, to provide the user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen.

The components of the apparatus 200 are communicatively coupled to each other via a bus 250 that enables transfer of data and control information between the components.

The memory 220 and a portion of the computer program code 225 stored therein may be further arranged, with the processor 210, to cause the apparatus 200 to perform at least some aspects of operation of the control portion 130 described in the foregoing. The processor 210 is configured to read from and write to the memory 220. Although the processor 210 is depicted as a respective single component, it may be implemented as respective one or more separate processing components. Similarly, although the memory 220 is depicted as a respective single component, it may be implemented as respective one or more separate components, some or all of which may be integrated/removable and/or may provide permanent/semi-permanent/dynamic/cached storage.

The computer program code 225 may comprise computer-executable instructions that implement at least some aspects of operation of the control portion 130 described in the foregoing when loaded into the processor 210. As an example, the computer program code 225 may include a computer program consisting of one or more sequences of one or more instructions. The processor 210 is able to load and execute the computer program by reading the one or more sequences of one or more instructions included therein from the memory 220. The one or more sequences of one or more instructions may be configured to, when executed by the processor 210, cause the apparatus 200 to perform at least some aspects of operation of the control portion 130 described in the foregoing. Hence, the apparatus 200 may comprise at least one processor 210 and at least one memory 220 including the computer program code 225 for one or more programs, the at least one memory 220 and the computer program code 225 configured to, with the at least one processor 210, cause the apparatus 200 to perform at least some aspects of operation of the control portion 130 described in the foregoing.

The computer program code 225 may be provided e.g. a computer program product comprising at least one computer-readable non-transitory medium having the computer program code 225 stored thereon, which computer program code 225, when executed by the processor 210 causes the apparatus 200 to perform at least some aspects of operation of the control portion 130 described in the foregoing. The computer-readable non-transitory medium may comprise a memory device or a record medium that tangibly embodies the computer program. As another example, the computer program may be provided as a signal configured to reliably transfer the computer program.

Reference(s) to a processor herein should not be understood to encompass only programmable processors, but also dedicated circuits such as field-programmable gate arrays (FPGA), application specific circuits (ASIC), signal processors, etc.

The invention claimed is:

1. A wind measurement apparatus comprising:
a cover portion and a base portion arranged at a distance from each other to allow for an airflow therebetween;
an arrangement of N receivers disposed on a base-portion-facing side of the cover portion in respective positions that serve as respective vertices of a convex regular polygon of order N, where N is at least three;
a transmitter disposed on the base-portion facing side of the cover portion in a position that is at a substantially equal distance from each of the N receivers; and
a reflector assembly arranged on a cover-portion-facing side of the base portion, wherein the reflector assembly is divided into N concave reflector portions,
wherein each receiver is associated with one of the reflector portions and wherein the reflector assembly and the base portion are disposed with respect to each other such that the transmitter is spatially aligned with a center point of the reflector assembly and that each receiver is spatially aligned with the associated reflector portion,
wherein the transmitter is arranged to transmit a measurement signal in a transmitter beam, TX beam, towards the reflector assembly such that the TX beam meets each of the reflector portions, and
wherein each of the receivers is arranged to receive, via the associated reflector portion, a reflection of a TX beam portion that meets the respective reflector portion.

2. The wind measurement apparatus according to claim 1, wherein each concave reflector portion is arranged to focus the respective TX beam portion that meets its surface to the receiver that is associated therewith.

3. The wind measurement apparatus according to claim 1, wherein each of the receivers is spatially aligned with a radial line segment that extends from the center of the reflector assembly towards a perimeter of the reflector assembly and that bisects the associated reflector portion.

4. The wind measurement apparatus according to claim 1, wherein each of the reflector portions is symmetrical with respect to a respective plane that is perpendicular to a reference plane defined by respective locations of the N receivers, that meets the center point of the reflector assembly and that bisects the respective reflector portion.

5. The wind measurement apparatus according to claim 1, wherein said N concave reflector portions are substantially identical to each other.

6. The wind measurement apparatus according to claim 1, wherein said measurement signal comprises an ultrasonic measurement signal.

7. The wind measurement apparatus according to claim 1, wherein each of the transmitter and the N receivers comprises a respective piezoelectric transducer.

8. The wind measurement apparatus according to claim 7, wherein each of the N piezoelectric transducers comprises a respective linear piezoelectric transducer.

9. The wind measurement apparatus according to claim 1, wherein the transmitter is arranged to transmit the TX beam having its center axis directed towards the center of the reflector assembly so as to split the TX beam into N TX beam portions for reflection from the respective reflector portions towards the respective receivers associated therewith.

10. The wind measurement apparatus according to claim 1, wherein a respective boundary between each pair of adjacent reflector portions forms a respective ridge and wherein said ridges meet at the center point of the reflector portion and form an apex.

11. The wind measurement apparatus according to claim 1, wherein each concave reflector portion comprises a concave reflector surface arranged with respect to the transmitter and the receiver associated with the respective reflector portion such that a reference axis meets the reflector surface at a normal angle, where said reference axis is substantially perpendicular to a reference plane defined by respective locations of the N receivers and it intersects a conceptual line segment connecting the transmitter and said the respective receiver at a position that is substantially at an equal distance from respective positions of the transmitter and said the respective receiver.

12. The wind measurement apparatus according to claim 1, wherein each concave reflector portion comprises a concave reflector surface defined as a portion of a concave cap of an underlying concave surface that is separated therefrom by a surface normal of its center axis, wherein the underlying concave surface comprises one of the following:

an ellipsoid, a sphere, a paraboloid.

13. The wind measurement apparatus according to claim 1, further comprising a control portion arranged to:

operate the transmitter to transmit the measurement signal in the TX beam;

operate each of the N receivers to capture the respective reflected measurement signal received in the reflections of the respective TX beam portions; and derive one or more wind characteristic based on respective propagation times of the respective reflected measurement signals captured at the N receivers.

14. The wind measurement apparatus according to claim 1, where N is three, the wind measurement apparatus thereby including:

an arrangement of three receivers disposed on the base-portion-facing side of the cover portion in respective positions that serve as respective vertices of a regular equilateral triangle and the transmitter disposed in a position that is at a substantially equal distance from the three receivers; and a reflector assembly arranged on the cover-portion-facing side of the base portion, wherein the reflector assembly is divided into three substantially identical concave reflector portions, the reflector assembly thereby exhibiting trilateral rotational symmetry.

15. The wind measurement apparatus according to claim 1, wherein said measurement signal comprises an ultrasonic measurement signal and wherein the apparatus further comprises a control portion arranged to:

operate the transmitter to transmit the measurement signal in the TX beam and operate each of the N receivers to capture the respective reflected measurement signal received in the reflections of the respective TX beam portions, and derive one or more wind characteristic based on respective propagation delays of the respective reflected measurement signals captured at the N receivers.

* * * * *